United States Patent Office 3,515,279
Patented June 2, 1970

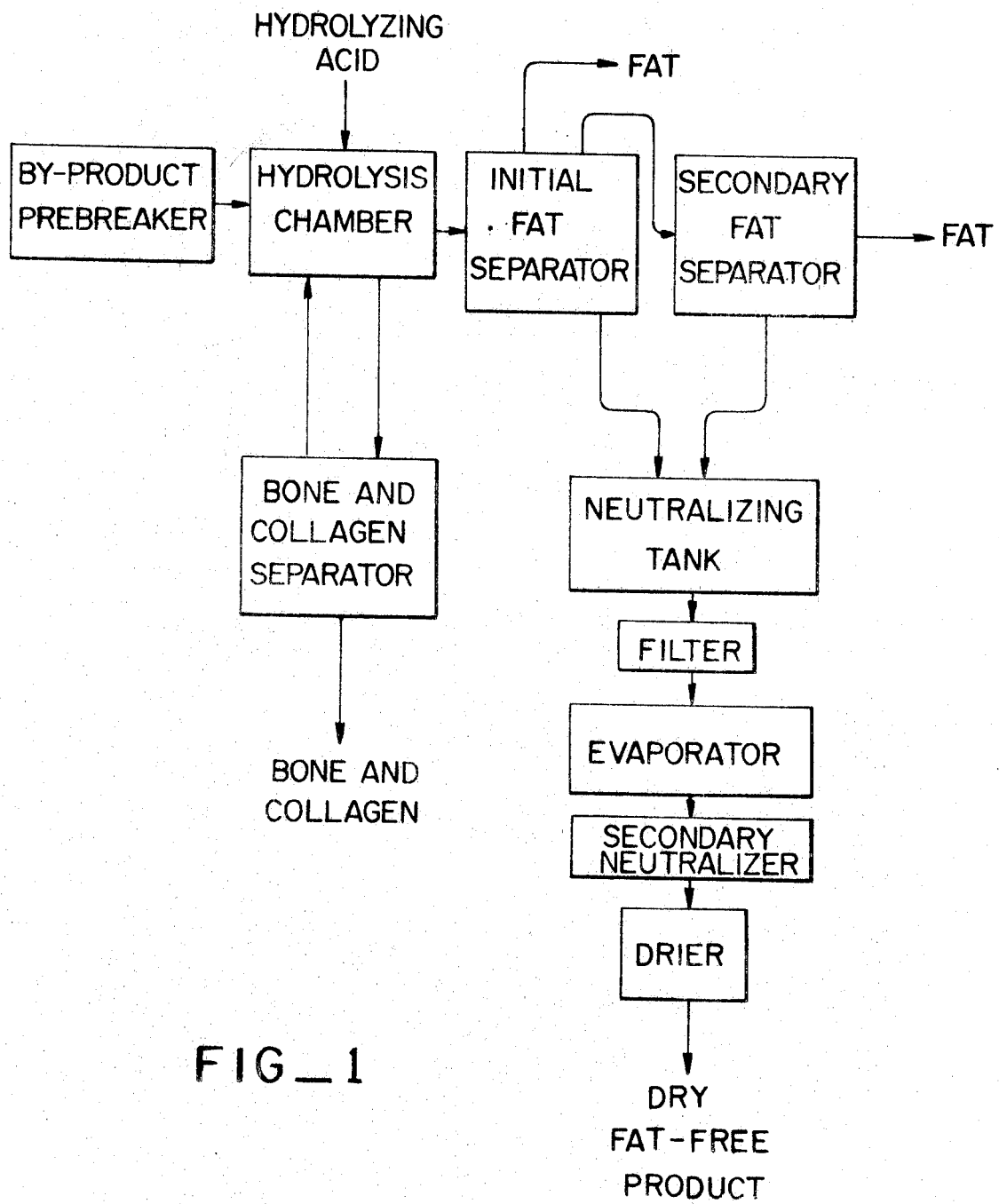
FIG_1

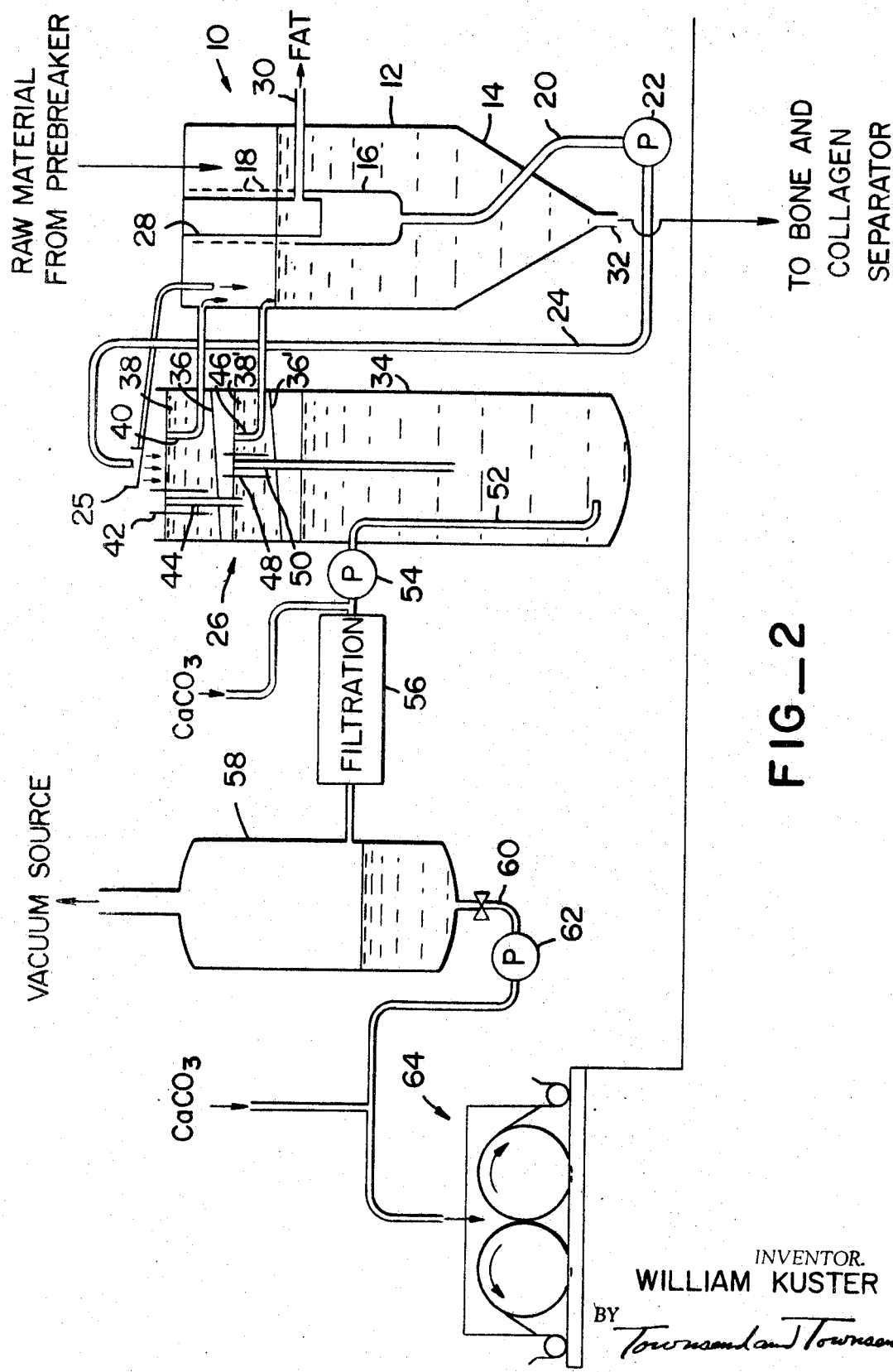

3,515,279
APPARATUS FOR RECOVERING A FAT-FREE
PROTEIN FROM ANIMAL BY-PRODUCTS
William Kuster, 1211 Avondale Road,
Hillsborough, Calif. 94010
Filed Apr. 3, 1968, Ser. No. 718,460
Int. Cl. B01d 21/10
U.S. Cl. 210—195　　　　　　　　　　　　　14 Claims

ABSTRACT OF THE DISCLOSURE

Apparatus for separating liquified fat from protein hydrolyzate including a series of settling chambers operated so that overflow therefrom is rich in liquified fat. The settling chambers are formed with a large cross-section to depth ratio so that ascension of the fat particles to the top of the hydrolyzate is rapid.

This invention relates to apparatus for accomplishing separation of fat from animal by-products to provide a fat-free nutritional food supplement. More particularly, the invention is directed to apparatus for removing liquified fat from protein hydrolyzate prior to neutralization or adjustment in the water content of the hydrolyzate.

The present invention is related to the invention described and claimed in U.S. Pat. No. 3,301,661, issued Jan. 31, 1967. This invention is applicable to the same general class of materials included therein and in many respects follows the general techniques there described.

In the preparation of nutritional, protein-rich feed supplements by treating animal by-products in a hot, acidic hydrolyzing solution, it is desirable to ensure that the supplement be devoid of the fat contained in the animal by-product utilized as a starting material. This is particularly true where the ultimate use of the feed supplement is for human consumption. Heretofore, satisfactory apparatus has not been available to accomplish this complete separation as desired.

The purpose of the present invention is to provide apparatus for eliminating the fat from an aqueous solution containing protein in about the polypeptide state of hydrolysis, and prior to neutralization or final water reduction. The gist of the invention involves removing substantially all of the liquified fat from the aqueous solution in a novel hydrolyzing vessel. Thereafter, the hydrolyzed protein and entrained liquified fat is subjected to a series of settling devices wherein the remaining liquified fat is caused to concentrate as a fat-rich upper layer and be removed as overflow. Remaining traces of fat in the aqueous protein phase can be removed by partially neutralizing this aqueous phase to form insoluble salts. When these salts can be removed by filtration, the minute fat particles are retained in the filter cake. This step is particularly useful with marine products where the "fishy" taste in the resulting protein paste or powder is caused by minute fat particles. Stability in storage is also improved by removal of these last traces of fat.

In the preparation of an easily handled end product, the fat-free hydrolyzate is then subjected to vaporization to reduce the water content thereof to form a paste. If a dry powder is desired, the concentrated protein solution is further neutralized with a calcium salt and reduced to a commercially dry powder (containing up to 12% water) on drum driers or other conventional water reduction equipment.

The various objects, features and advantages of this invention will become apparent when reference is made to the following detailed disclosure and especially in view of the attached drawings wherein:

FIG. 1 is a flow diagram illustrating the general procedure for treating animal by-products to yield a dry fat-free product; and FIG. 2 is a cutaway partially schematic elevational view of the apparatus employed to accomplish total fat separation and to yield a dry, fat-free product.

The term "animal by-product" is intended to include slaughterhouse offal, poultry viscera, epidermal outgrowth and bone trimmings as well as whole animals such as poultry, fish, crustaceans and other marine organisms, and the like. Although the hydrolyzing acid employed may be sulfuric acid, hydrochloric acid and the like, phosphoric acid is preferred and will be referred to hereinafter by way of example and illustration. It will be understood by one skilled in this art that the conditions utilized within the hydrolysis chamber are those that have been previously employed in this art. In this regard, the hydrolyzing temperature is normally maintained at about the boiling point of the aqueous solution and normally slightly above the boiling point of water at atmospheric pressure (about 214° to 218° F.). Of course, it is also possible to hydrolyze the animal by-product at temperatures higher or lower than the boiling point of water at atmospheric pressure. The desired temperature can be obtained by live steam, or a steam jacket or by external heaters, or a steam coil in the hydrolyzing vessel.

It is advantageous for the hydrolysis of the protein components of the animal by-products to be arrested at approximately the polypeptide stage, i.e., when the protein first becomes solubilized. In this manner, the fat portion, normally liquified by the elevated temperature conditions in the hydrolyzing chamber, will be released and will rise to the top of the hot acid solution. Furthermore, when the protein components have reached the polypeptide stage and gone into solution, the protein matter will become water soluble but will not have been broken down to the amino acid condition where further hydrolysis would cause decomposition of some of the nutritionally most valuable amino acids. It will be understood by those skilled in this art that the proteins and protein derivatives are not all in a homogeneous stage, but that the term "polypeptide" is intended to cover the average condition of the protein material, including finely-dispersed particles that may not have quite reached the liquid stage. The protein may also be in the form of peptones and just soluble in water, while some of the protein may be converted to the peptide stage.

Referring now to the drawings, FIG. 1 depicts a schematic flow diagram wherein animal by-products are first treated in a pre-breaker, if necessary, to reduce the size of bone pieces or shells and the like to provide particles of a more uniform size. The by-product particles are then subjected to hydrolysis from which a side stream containing a high concentration of bone and/or collagen is separated and subjected to further treatment to remove the bone and/or collagen.

Referring now to FIG. 2, there is shown hydrolysis chamber 10 including an upright cylindrical shell 12 secured to an inwardly-converging conical segment 14 at the lower end thereof. Disposed within chamber 10 and in rigid corresponding alignment with shell 12 is tank 16. Tank 16 is in fluid communication with chamber 10 through a plurality of annularly-spaced apertures 18. Alternatively, tank 16 can be provided with a coarse screen (not shown) over apertures 18 to prevent passage of any selected size of undigested portions of animal tissue into tank 16. Furthermore, tank 16 can be formed with interchangeable upper portions so that apertures of varying sizes may be utilized depending on the particle size separation desired.

Conduit 20 is arranged in fluid communication with tank 16 to provide for withdrawal of fluid from the bottom of tank 16 as desired. The egress of protein hydrolyzate from tank 16 through conduit 20 is controlled by pump 22. Pump 22 is connected to conduit 24 for flowing the pumped hydrolyzate through inclined screen 25 and then into the top of multi-stage settling chamber 26. Overflow (oversized particles) from screen 25 is returned to the top of chamber 10 for further hydrolysis. Screen 25 can be vibrated to accelerate flow therethrough and is interchangeable to control particle size.

Mounted within tank 16 and in spaced alignment with the upright walls thereof is annular-shaped weir 28, of cylindrical configuration, and having a lower end extending below apertures 18 in tank 16. Weir 28 is provided with an outlet conduit 30 near its lower end for withdrawing the upper layer of fluid (liquified fat) from tank 16 as described in greater detail, supra. Conventional sensing means, not shown, can be employed to monitor the interface between the liquified fat layer and the protein hydrolyzate, so that fat is withdrawn through conduit 30 until the interface level thereof reaches the upper sensor, then protein hydrolyzate is withdrawn through conduit 20 until the interface level thereof drops to the lower sensor. Weir 28 acts as a shield to prevent liquified protein from being removed through conduit 30.

Aperture 32 is located near the bottom of chamber 10 for withdrawing a stream of aqueous solution that contains a concentrated portion of bone and collagen for further treatment in a bone/collagen separator.

Settling chamber 26, for secondary removal of liquified fat, includes a cylindrical outer shell 34 and a series of transverse baffle plates 36 and 36' that divide the upper portion of shell 34 into settling zones 38 and 38', respectively. Overflow conduit 40 extends from within zone 38 and provides for recycle of liquified fat to hydrolysis chamber 10. In this manner, any fat that accumulates on the upper surface of the liquid within zone 38 is returned as overflow to chamber 10. Zone 38 also includes upright annular baffle 42 in spaced relationship to hydrolyzate overflow conduit 44. Baffle 42 acts as a shield to prevent liquified fat from being removed with liquified protein through conduit 44 which is slightly lower than conduit 40 so that substantially all the fat will be separated through the aqueous phase conduit 40 without substantial entrainment in the aqueous phase. Conduit 44 extends from within annular baffle 42 through plate 36 and into zone 38' for conveying the acidic protein hydrolyzate from zone 38 to zone 38'. Zone 38' is of similar construction to zone 38 in that it is provided with fat overflow conduit 46 having one end in fluid communication with separator 10 for returning liquified fat overflowing from separator 38' to hydrolysis chamber 10. Annular baffle 48 is provided to surround conduit 50 so that when acidic hydrolyzate is caused to overflow into conduit 50 and from zone 38' into the lower portion of multistage settling chamber 26, liquified fat will be prevented from egressing through conduit 50. Again, conduit 50 has its upper end disposed slightly below the upper end of conduit 46.

It will be apparent to one skilled in this art that additional stages may be employed where necessary to accomplish a substantially complete separation of fat from the liquified protein. Furthermore, the overflow need not be directed back to separator 10 but may be removed as a sidestream for desired disposition. In addition, it will be understood that the overflow of liquified fat removed through conduits 40 and 46, respectively, may include a foam or emulsion and small amounts of liquified protein. However, the liquified protein being withdrawn through conduits 44 and 50 will be substantially free of fat.

The lower portion of settling chamber 26 is provided with conduit 52 and pump 54 for removing the acid hydrolyzate and flowing it through means (not shown) for partial neutralization and then through filtration unit 56.

Here again, it will be obvious to one skilled in this art that both the neutralization and filtration steps are not always necessary to provide a complete separation of fat and protein and may be optional.

Vacuum chamber 58 is in fluid communication with filter 56 and is attached to a vacuum source for evaporation of a substantial portion of the water content of the protein-rich hydrolyzate. Of course, it is preferable that vacuum evaporation be accomplished in conjunction with supplemental heating of the hydrolyzate to vaporize the water and thereby reduce the water content. In general, the water content of the concentrated product at this stage will be in the range of 40% to 50% but may be lower depending on raw materials. When the desired reduction in the water content has been accomplished, the concentrated hydrolyzate is withdrawn through conduit 60 to finished product storage or conveyed via pump 62 to drum driers 64.

It is advantageous to neutralize with a calcium compound such as calcium oxide, calcium hydroxide, or calcium carbonate in an amount sufficient to adjust the pH towards neutrality, i.e., a pH of 5–8, preferably about 5.5–6, near the isoelectric point of the salt that is desired in the end product, prior to applying the hydrolyzate to the surface of the drum drier. The reason for this is that the calcium compounds serve to neutralize the acid content of the protein hydrolyzate while the calcium ions present form an insoluble di-calcium phosphate salt from the acid soluble monocalcium phosphate salt present in the solution. Each molecule of anhydrous di-calcium phosphate salt from the acid soluble monocalcium phosphate salt present in the solution. Each molecule of anhydrous di-calcium phosphate salt forms with two water molecules of hydration attached. Thus the remaining moisture composition of the solution leaving the evaporator is substantially reduced prior to and during treatment in drum dryers 64. In this manner, a final product having a desired low quantity of water is obtained. It is to be noted that a "dry" product as used herein may contain from about 5–12% moisture and still be free flowing and appear to be dry. The term "dry" should be construed so as to include such "commercially dry" materials. The carbon dioxide liberated during the aforementioned reaction assists materially in drying of the thermoplastic proteinaceous material.

In operation, raw material is introduced into separator 10 initially filled with an aqueous solution of phosphoric acid (having a pH adjusted to about 1–3). After a proper amount of lead time while the acidic solution initiates the hydrolysis of the animal protein, a series of streams are withdrawn from the separator, both by pumping and displacement with additional raw materials. Thus, any bone and collagen in the animal by-product is withdrawn as a bone/collagen-rich stream from the bottom of separator 10 and recirculated to the top thereof through a bone-separating device. In addition, an upper layer of liquified fat is removed through conduit 30. Alternately therewith, the fat level in tank 16 is adjusted by withdrawing protein hydrolyzate through conduit 20 and conveying it to the top of settling chamber 26 through conduit 24 and screen 25.

A further removal of fat from the hydrolyzate is then accomplished in zones 38 and 38' by providing for separation of the layer of liquified fat from the top of the protein hydrolyzate. In a preferred aspect, settling zones 38 and 38' are formed with a relatively large diameter with respect to the depth of the solution, preferably having a diameter to depth ratio of at least 4 to 1 or even greater. In this manner, rapid and nearly complete liquid/fat separation is attained as the lighter liquified fat quickly rises through the short depth of liquid to the top of the zone. After being treated in this series of settling chambers, the acidic hydrolyzate is partially neutralized and filtered, then introduced into a vacuum chamber, preferably heated, wherein a substantial portion of the water content thereof is vaporized to form a paste which may be the end product. Alternately, the acidity can be further neutralized with a calcium compound to near the isoelectric point for the salt to be formed. In this manner, additional water is removed (thus reducing the water content) through formation of water of hydration. Finally the hydrolyzate can be converted to the desired end product form (dry powder) by removing additional water with drum driers.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Apparatus for accomplishing a separation of fat from animal by products in a hot aqueous solution, comprising: a chamber for accomplishing hydrolysis of said animal by-products and liquification of said fat, said chamber including means for separating an upper layer of liquified fat; means for removing an incremental portion of the hydrolyzed animal by-product from said chamber; and means for receiving said incremental portion, said means including at least one settling zone provided with a first overflow outlet for removing liquified fat as a top layer of said incremental portion and a second overflow outlet for removing the remainder of said incremental portion whereby liquified fat suspended in said incremental portion will be removed from said zone through said first overflow outlet.

2. Apparatus in accordance with claim 1 wherein said first chamber includes an upright cylindrical segment.

3. Apparatus in accordance with claim 1 wherein said first overflow outlet is in fluid communication with said first chamber for recirculating said top layer to said first chamber.

4. Apparatus in accordance with claim 1 wherein said second overflow outlet includes an upright conduit and an annular baffle spaced from said conduit and extending from above the top of said conduit to overlap a segment thereof wherein any liquified fat that accumulates as a top layer in said settling zone will be prevented from flowing out through said conduit.

5. Apparatus in accordance with claim 4 wherein said baffle extends substantially the height of said settling zone.

6. Apparatus in accordance with claim 1 wherein said receiving means includes a second settling zone, said second overflow conduit being in fluid communication with said second zone.

7. Apparatus in accordance with claim 6 and further characterized by means for screening said incremental portion prior to passage to said settling zone.

8. A hydrolysis chamber for accomplishing separation of fat from a hot aqueous solution containing animal by-products, comprising: a shell including an upridght cylindrical portion; a cylindrical tank coaxially aligned with said shell, the upper portion of said tank containing a plurality of spaced apertures for providing fluid communication from within said shell to within said tank, said tank having fluid outlet means extending through said shell; and baffle means within said tank, the upper end of said baffle means being coextensive with the upper end of said tank and the lower end extending below said upper portion, outlet means extending from about the lower end of said baffle means through said shell whereby any fat in said aqueous solution that flows through said apertures will separate into an upper fat layer for removal through the outlet means of said baffle means.

9. A chamber in accordance with claim 8 wherein the upper portion of said tank is replaceable to provide apertures of various cross-section.

10. A chamber in accordance with claim 8 wherein said apertures have a size graduation.

11. A chamber in accordance with claim 8 wherein said baffle means are cylindrical and coaxially aligned within said tank.

12. A chamber in accordance with claim 8 and further suitable for treating animal by-products containing bone and collagen, wherein said shell includes a lower inwardly tapering conical segment, said segment including an outlet for removing a stream of hot aqueous solution containing a concentrated amount of bone and collagen.

13. A chamber in accordance with claim 1 and further characterized by means for screening said incremental portion prior to passage thereof to said settling zone.

14. A chamber in accordance with claim 13 wherein said screening means can be vibrated.

References Cited

UNITED STATES PATENTS

| 1,170,558 | 2/1916  | Nonnenbruch | 210—83   |
| 1,543,621 | 6/1925  | Ruckstuhl   | 210—522 X |
| 2,344,355 | 3/1944  | Harms       | 210—522  |
| 2,363,176 | 11/1944 | Gunz        | 210—195 X |

JAMES L. DECESARE, Primary Examiner

U.S. Cl. X.R.

210—522